(12) United States Patent
Fischer et al.

(10) Patent No.: US 6,877,772 B2
(45) Date of Patent: Apr. 12, 2005

(54) AIR BAG MODULE WITH OCCUPANT ENGAGING FLAP

(75) Inventors: Kurt F. Fischer, Oxford, MI (US); John G. Bauer, Troy, MI (US); David F. Sutter, New Baltimore, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 10/037,651

(22) Filed: Jan. 3, 2002

(65) Prior Publication Data

US 2003/0122356 A1 Jul. 3, 2003

(51) Int. Cl.⁷ .............................................. B60R 21/16
(52) U.S. Cl. ................................ 280/743.1; 280/730.1
(58) Field of Search ............................ 280/730.1, 732, 280/728.3, 743.1, 731, 743.2

(56) References Cited

U.S. PATENT DOCUMENTS

| | | | | |
|---|---|---|---|---|
| 2,834,606 A | * | 5/1958 | Bertrand | 280/730.1 |
| 3,753,576 A | * | 8/1973 | Gorman | 280/730.1 |
| 4,772,045 A | * | 9/1988 | Kawaguchi et al. | 280/731 |
| 4,842,300 A | | 6/1989 | Ziomek et al. | |
| 4,911,471 A | * | 3/1990 | Hirabayashi | 280/732 |
| 4,964,654 A | | 10/1990 | Bishop et al. | |
| 5,348,343 A | | 9/1994 | Hawthorn | |
| 5,429,385 A | | 7/1995 | Kamiji et al. | |
| 5,560,648 A | * | 10/1996 | Rhule et al. | 280/731 |
| 5,588,674 A | | 12/1996 | Yoshimura et al. | |
| 5,603,523 A | | 2/1997 | Rhule et al. | |
| 5,630,614 A | | 5/1997 | Conlee et al. | |
| 5,823,566 A | | 10/1998 | Manire | |
| 6,164,685 A | | 12/2000 | Fischer et al. | |
| 6,474,686 B1 | * | 11/2002 | Higuchi et al. | 280/743.1 |
| 6,572,137 B2 | * | 6/2003 | Bossecker et al. | 280/730.1 |

* cited by examiner

*Primary Examiner*—Faye M. Fleming
(74) *Attorney, Agent, or Firm*—Tarolli, Sundheim, Covell & Tummino L.L.P.

(57) ABSTRACT

An apparatus (10) for helping to protect a vehicle occupant (36) includes an inflatable vehicle occupant protection device (44) having a stored, deflated condition and an inflated condition for helping to protect the occupant. An inflator (46) provides inflation fluid to inflate the protection device (44). The apparatus (10) also includes a flap (80) made of fabric material. The flap (80) is stored with the protection device (44). The flap (80) is deployed by inflation of the protection device (44) into a position engaging and covering a head (38) of the vehicle occupant for guiding deployment of the protection device (44) over the head of the occupant.

9 Claims, 4 Drawing Sheets

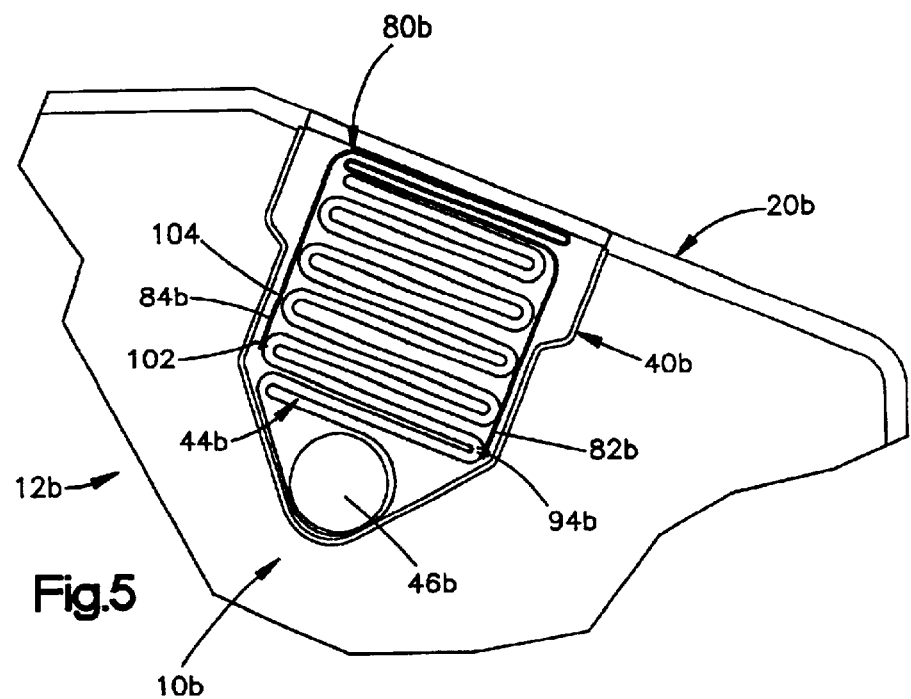
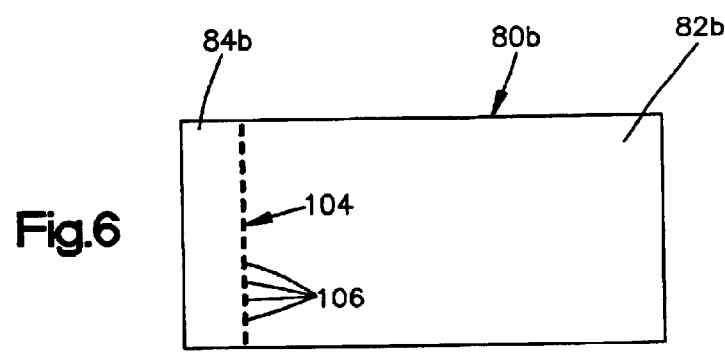

AIR BAG MODULE WITH OCCUPANT ENGAGING FLAP

BACKGROUND OF THE INVENTION

1. Technical Field

The present invention relates to a vehicle occupant protection apparatus and, in particular, to an air bag module including a flap that deploys with an inflating air bag to help protect the vehicle occupant.

2. Description of the Prior Art

It is known to inflate an air bag to help protect a vehicle occupant in the event of a vehicle collision. To help protect a front seat passenger of a vehicle, an air bag is typically mounted in the instrument panel of the vehicle, together with an inflator, at a location forward of the occupant's seat. A deployment opening in the instrument panel is covered by a movable deployment door. The inflator is actuated in the event of a vehicle collision to inflate the air bag through the deployment opening. The deployment door pivots open under the force of the inflating air bag, to enable inflation of the air bag into a position to help protect the vehicle occupant.

If an occupant is in close proximity to the instrument panel when the inflator is actuated, the air bag might inflate against the occupant's head and neck, perhaps while moving in an upward direction. This can undesirably increase the loads on the occupant's head and neck.

SUMMARY OF THE INVENTION

The present invention is an apparatus for helping to protect a vehicle occupant. The apparatus comprises an inflatable vehicle occupant protection device having a stored, deflated condition and an inflated condition for helping to protect a vehicle occupant. An inflator provides inflation fluid to inflate the protection device. The apparatus also includes a flap made of fabric material. The flap is stored with the protection device. In the case of the occupant being in close proximity to the instrument panel, the flap is deployed by inflation of the protection device into a position engaging and covering a head of a vehicle occupant for guiding deployment of the protection device over the head of the vehicle occupant.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 5 is a view similar to FIG. 2 showing a protection apparatus in accordance with a third embodiment of the present invention;

FIG. 6 is a plan view of a flap that forms part of the protection apparatus of FIG. 5;

DETAILED DESCRIPTION OF THE INVENTION

Figure 1:
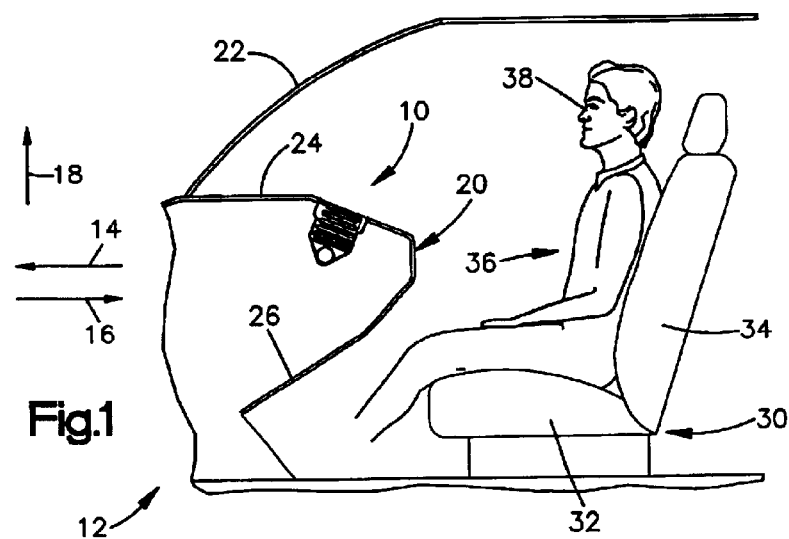
FIG. 1 is a schematic illustration of a portion of a vehicle including a vehicle protection apparatus in accordance with a first embodiment of the present invention.

The present invention relates to a vehicle protection apparatus for protecting an occupant of a vehicle in the event of a vehicle collision. The present invention is applicable to various vehicle protection apparatus constructions. As representative of the present invention, FIG. 1 illustrates a vehicle protection apparatus or air bag module 10.

The air bag module 10 is located on the front passenger side of a vehicle 12. A forward direction of travel of the vehicle 12 is indicated by the arrow 14 and the rearward direction of travel is indicated by the arrow 16. A vertically upward direction in the vehicle 12 is indicated by the arrow 18.

The vehicle 12 includes an instrument panel 20, only portions of which are shown. A windshield 22 of the vehicle extends upward and rearward from the forward edge of the instrument panel 20. The instrument panel 20 includes an upper or front portion 24 that slopes downward and rearward from the base of the windshield 22. A lower or rear portion 26 of the instrument panel 20 extends downward and forward from the rear edge of the front portion 24. The instrument panel 20 can be made from a metal substrate and an overlying plastic material covering, but may alternatively be made in any known manner.

The vehicle includes a seat 30 having a seat bottom cushion 32 and a seat back 34. In FIG. 1 there is shown a vehicle occupant 36 seated on the seat 30. The occupant 36 is seated on the seat bottom cushion 32, and is leaning back against the seat back 34. The occupant 36 has a head 38. The occupant 36 and the seat 30 are located rearward of the instrument panel 20 and the air bag module 10.

The vehicle protection apparatus 10 includes a reaction canister or housing 40 (FIG. 2) that is supported on the vehicle instrument panel 20 in a known manner by fasteners (not shown). The housing 40 encloses and supports an air bag indicated schematically at 44 and an inflator indicated schematically at 46. The inflator 46 is a known inflator that, upon actuation, provides inflation fluid to inflate the air bag 44 into a position to help protect a vehicle occupant. The air bag 44 is a known air bag that is folded and stored in a known manner in the housing 40.

The upper portion 24 of the instrument panel 20 has upper and lower edge surfaces 50 and 52, respectively, and side edge surfaces (not shown) that define a deployment opening 60 in the instrument panel 20. In the embodiment shown in FIGS. 1 and 2, the deployment opening 60 faces generally upward and rearward in the vehicle, toward the windshield 22 and the vehicle occupant 36.

The air bag module 10 includes a single door panel 70 that covers substantially the entire deployment opening 60. It should be understood that the module 10 could, alternatively, include more than one door for covering the deployment opening 60. The door panel 70 may be made from a plastic material similar to the covering of the instrument panel 20. The door panel 70 has a forward or upper edge portion 72 disposed closer to the vehicle windshield 22 and a lower or rear edge portion 74 disposed farther from the windshield, that is, closer to the vehicle occupant. The lower edge portion 74 of the door panel 70 is releasably connected with the lower edge surface 52 on the instrument panel 20 by a rupturable portion or tear seam 76.

Figure 2:
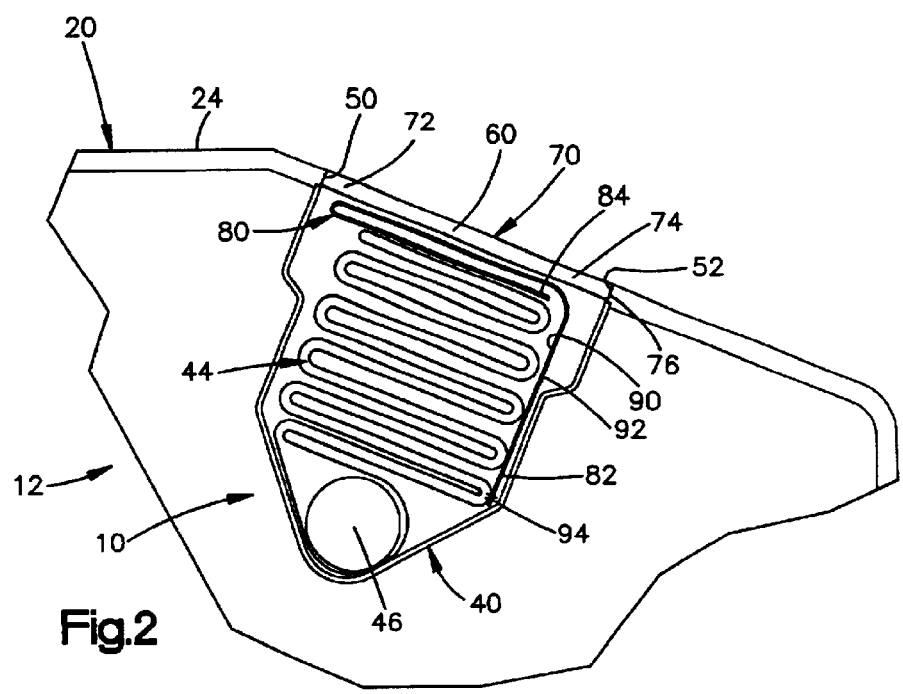
FIG. 2 is an enlarged view of the vehicle protection apparatus of FIG. 1, shown in a condition prior to actuation.
Figure 3:
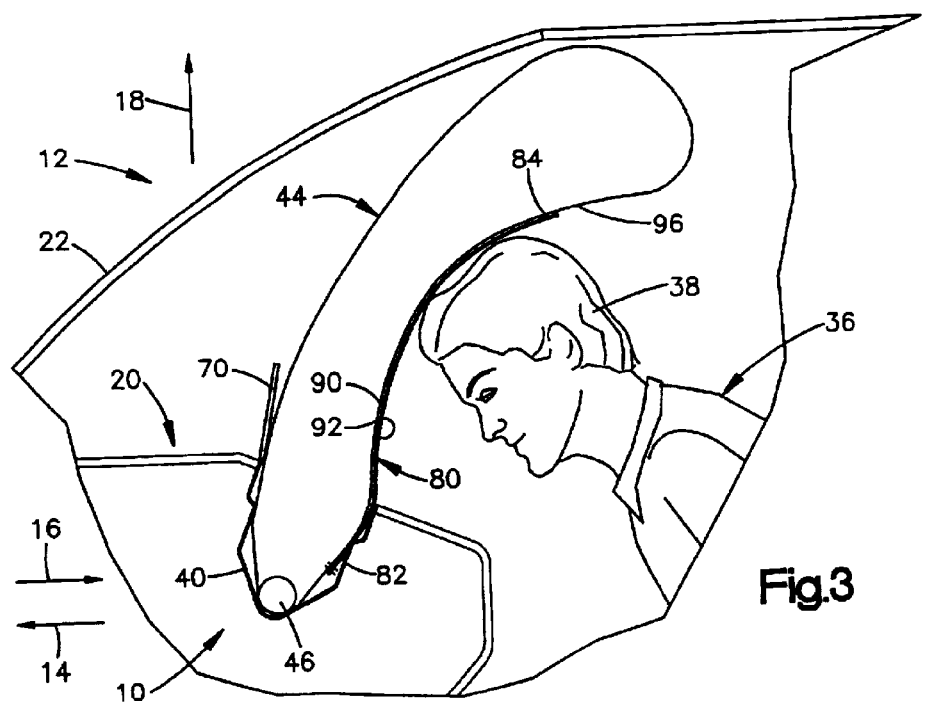
FIG. 3 is a view similar to FIG. 1 showing the protection apparatus of FIG. 1 in a condition after actuation.

The air bag module 10 also includes a flap 80 (FIGS. 2 and 3). The flap 80 is a structure that is located between the air bag 44 and the head 38 of the occupant 36, when the air bag is inflated, as described below. The flap 80 engages and extends over the head 38 of the occupant 36, particularly if the occupant is leaning forward as shown in FIG. 3. The flap prevents the air bag 44 itself from engaging the head of the occupant. The flap 80 acts as a guide to guide the air bag 44 to inflate past the head 38 of the occupant 36 without actually engaging the head of the occupant.

The flap 80 is preferably made from a fabric material, which may be the same material from which the air bag 44 is made. One suitable material is woven nylon, a material that is commonly used to make air bags.

The flap 80 has first and second end portions, or ends, 82 and 84. The flap 80 has first and second opposite major side surfaces 90 and 92 (FIG. 3). In the embodiment illustrated in FIGS. 1–3, the flap 80 is made from a piece of fabric material that is not coated on either side. Therefore, the first and second major side surfaces 90 and 92 of the flap 80 have the same coefficient of friction as each other.

The length of the flap 80 is selected so that it extends over (past the top of) the head 38 of a forward seated occupant 36 when the flap is fully deployed. In one embodiment, the flap 80 is a rectangular piece of material having a width (transversely across the deployment opening 90) of about 300 millimeters, and a length (extending out from the deployment opening) of about 400 millimeters.

The first end portion 82 of the flap 80 is attached to the air bag module 10. In the embodiment illustrated in FIGS. 1–3, the first end portion 82 of the flap 80 is sewn to the air bag 44, at a location near the lower or rearward edge 52 of the deployment opening 60, with a permanent stitching section 94 (FIG. 2). The opposite second end portion 84 of the flap 80 is free-that is, it is not connected with or secured to the air bag module 10, other than through the sewing of the first end portion.

The air bag 44 is folded and/or rolled, and packed into the housing 40. The flap 80, as shown in FIG. 2, is folded over the top of the folded air bag 44. The folded flap 80 is located immediately under the door panel 70. Thus, the flap 80 and air bag 44 are stored together in the housing 40.

In the event of a vehicle collision for which it is desired to inflate the air bag 44, the inflator 46 is actuated in a known manner by a collision sensor (not shown). The inflator 46 directs inflation fluid into the air bag 44. The inflating air bag 44 presses outwardly against the door panel 70 and causes the tear seam 76 to rupture. The door panel 70 pivots about its upper edge portion 72, relative to the instrument panel 20, from the closed condition shown in FIGS. 1 and 2 to the open condition shown in FIG. 3.

The air bag 44 inflates into the inflated condition shown in FIG. 3. When the air bag 44 is inflated, the air bag has a rearward-facing outer surface portion 96 that is presented toward, and is closest to, the vehicle occupant 36.

As the air bag 44 inflates, the air bag pushes the flap 80 out of the housing 40, from its stored condition shown in FIG. 2 to an open or operative condition shown in FIG. 3. In this condition, the flap 80 is unfolded and is disposed rearward of the air bag 44. The flap 80 extends between the outer surface portion 96 of the air bag 44, and the vehicle occupant 36.

The second end portion 84 of the flap 80 is outermost, that is, located farthest from the housing 40. The first major side surface 90 of the flap 80 faces forward, and engages the outer surface portion 96 of the air bag 44. The second major side surface 92 of the flap 80 faces rearward, and is engageable by the occupant 36.

In FIG. 3, the vehicle occupant 36 is shown in a forward position, not seated against the seat back 34 of the vehicle seat 30. In this position, the occupant 36 may be contacted by the air bag 44 as the air bag inflates. If such contact occurs, portions of the inflating air bag 44 may catch on the occupant's chin or other portions of the head 38, and exert undesired upward and rearward directed forces on the occupant's head and/or neck.

The flap 80 helps to minimize such forces. Specifically, the flap 80 engages the head 38 of the vehicle occupant 36. The inflating air bag 44, as it inflates upward and rearward, slides along the first major side surface 90 of the flap 80. The inflating air bag 44 does not contact the occupant's head 38. The first major side surface 90 of the flap 80 presents a relatively smooth and unobstructed surface to the air bag 44. Thus, the flap 80 does not resist the upward movement of the air bag 44 so much as it would be resisted by contact with the vehicle occupant 36. As a result, any force tending to push the head 38 of the occupant 36 up is minimized.

As noted above, the flap 80 is pushed outward and rearward by the inflating air bag 44. If the vehicle occupant 36 is leaning back against the seat back 34 when the air bag 44 inflates, the flap 80 is pushed downward against the lower part 26 of the instrument panel 20, not contacting the occupant 36 at all. If the occupant 36 is neither leaning back against the seat back 34 nor forward against the instrument panel 20 when the air bag 44 inflates, the flap 80 may or may not contact the occupant 36. In any event, the flap 80 does not wave loosely through the air but instead is always pushed by the inflating air bag 44.

FIGS. 4–9 illustrate alternative embodiments of the invention, that are similar in many respects to the embodiment illustrated in FIGS. 1–3. Parts of the air bag modules shown in FIGS. 4–8 that are the same, or similar in function or construction, are given the same reference numerals with an appropriate letter suffix added to distinguish them.

Figure 4:
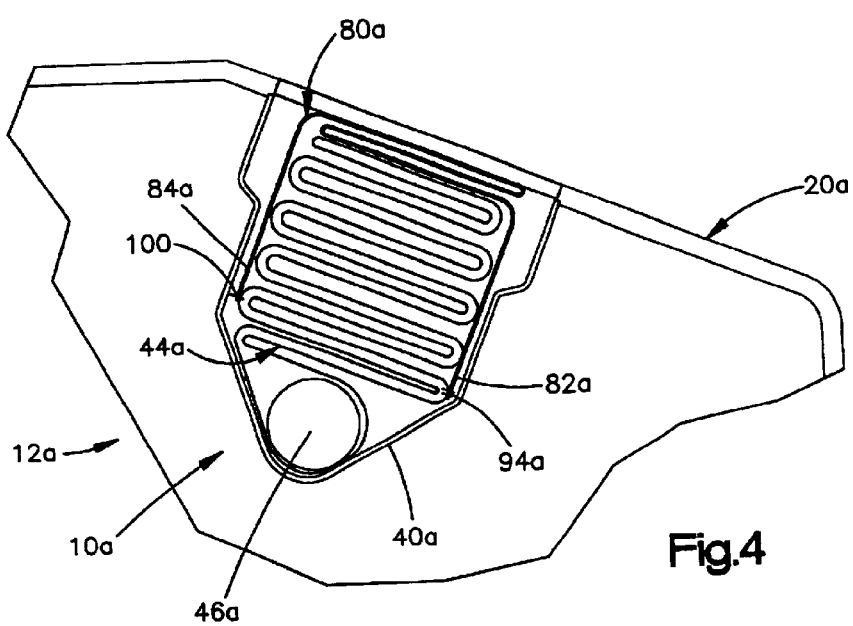
FIG. 4 is a view similar to FIG. 2 showing a protection apparatus in accordance with a second embodiment of the present invention.

In a second embodiment of the invention that is illustrated in FIG. 4, the second end portion 84*a* of the flap 80*a* is sewn to the air bag 44*a*, with a releasable stitching section 100. The first end portion 82*a* of the flap 80*a* is sewn to the air bag 44*a* with a permanent stitching section 94*a*. When the air bag 44*a* inflates (not shown), the releasable stitching section 100 releases (tears), freeing the second end portion 84*a* of the flap 80*a* and allowing the flap to move into position between the inflating air bag and the occupant.

In a third embodiment as illustrated in FIGS. 5 and 6, the first end portion 82*b* of the flap 80*b* is sewn to the air bag 44*b* with a permanent stitching section 94*b*, and the second end portion 84*b* of the flap is also sewn to the air bag with a permanent stitching section 102. The flap 80*b* has a rupturable portion 104 between the first and second end portions 82*b* and 84*b*. The rupturable portion 104 may be formed as a line of perforations 106. The rupturable portion 104 is located near the second end portion 84*b* of the flap 80*b*. When the air bag 44*b* inflates, the rupturable portion 104 of the flap 80*b* ruptures. The air bag 44*b* tears along the line of perforations 106, freeing the flap 80*b* to move into position between the inflating air bag 44*b* and the head of the occupant.

Figure 7:
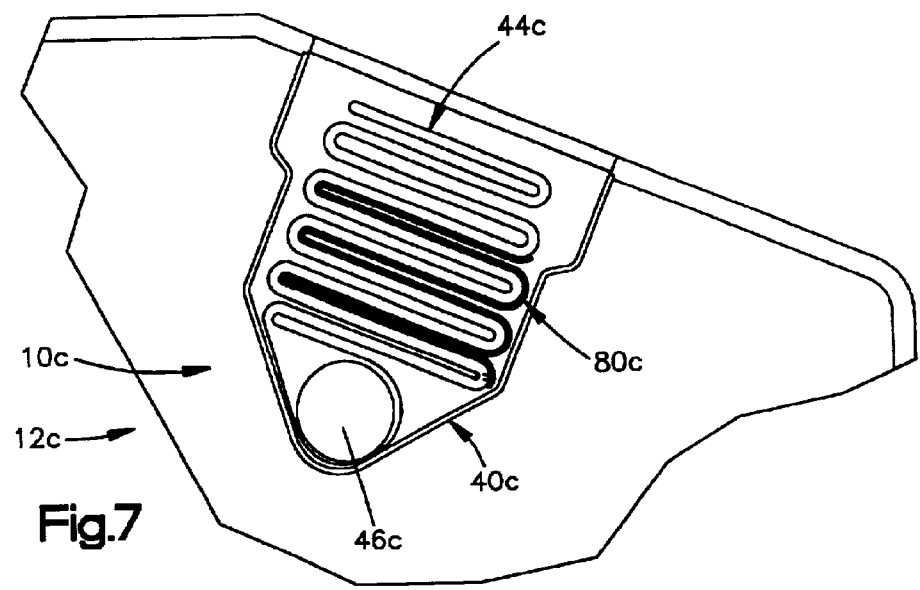
FIG. 7 is a view similar to FIG. 2 showing a protection apparatus in accordance with a fourth embodiment of the present invention.

In a fourth embodiment as illustrated in FIG. 7, the flap 80*c* is folded and/or rolled with the air bag 44*c* in the housing 40c. Specifically, the air bag 44c is Z-folded, with the flap 80c folded in with the air bag. If, alternatively, the air bag 44c is rolled toward the forward portion of the module 10c (nearer the windshield), the flap 80c is rolled with the air bag. When the air bag 44c inflates, it unrolls or unfolds, and the flap 80c unrolls or unfolds with the air bag.

Figure 8:
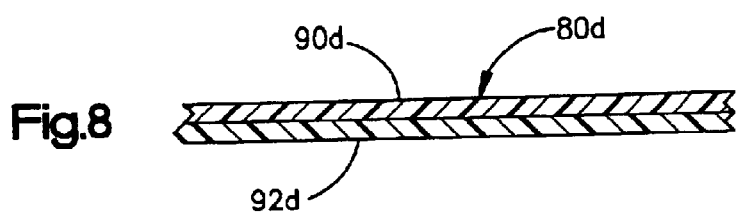
FIG. 8 is a sectional view of a flap that forms part of a fifth embodiment of the present invention.

In a fifth embodiment of the invention illustrated in FIG. 8, one of the side surfaces of the flap 80d is coated or otherwise treated or formed to have an increased coefficient of friction. Specifically, the second major side surface 92d of the flap 80d, which is presented toward and is engageable by the vehicle occupant, is coated with or formed of a material to make it "stickier"—that is, to provide a higher coefficient of friction. The coating material could be silicone, or rubber, or another such suitable material.

Any one of the embodiments can include a coated flap as in FIG. 8. When the flap 80d is deployed, for example as in FIG. 3, the uncoated first major side surface 90d of the flap is presented forward, away from the occupant, toward the inflating air bag itself. This surface 90d is engaged by the outer surface portion of the air bag as it inflates upward past the occupant's head. This surface 90d is relatively smooth and slick, so that as a result, the air bag inflates smoothly upward, without getting caught on the flap 80d or on the occupant. The stickier second major side surface 92d of the flap 80d contacts the occupant, and helps keep the flap in contact with and in position against the occupant's head. Because the flap 80d stays in position on the occupant, the inflating air bag can slide over the relatively slippery first major side surface 90d of the flap and go up over the occupant's head as described above.

Figure 9:
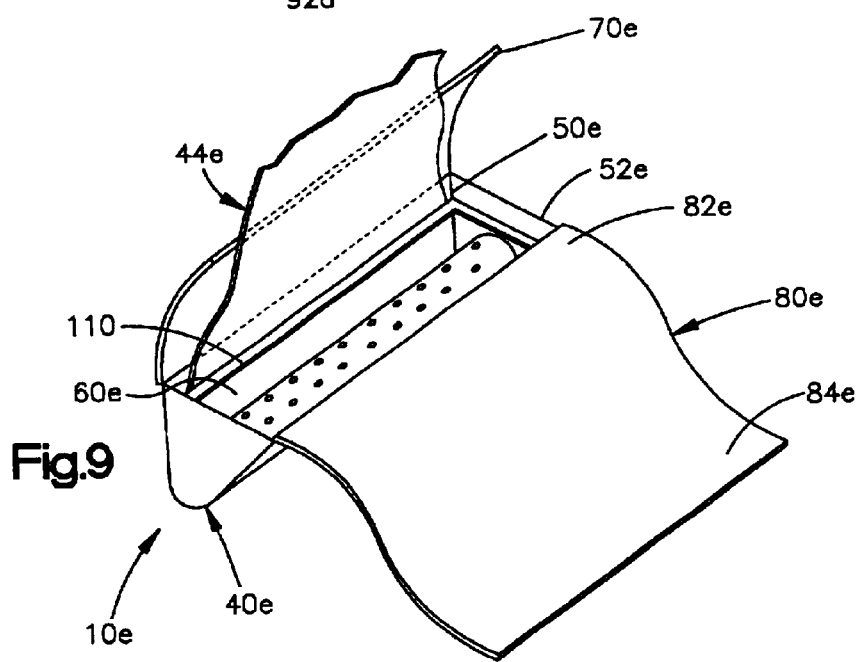
FIG. 9 is a perspective view of a protection apparatus in accordance with a sixth embodiment of the invention.

FIG. 9 illustrates another embodiment of the invention, in which the flap 80e is attached to the housing 40e or to another part of the module 10e than the air bag 44e. This attachment could be done by rivets, or with a retaining ring, or in another suitable manner. In the module 10e, the air bag 44e is attached to the housing 40e by a retainer or retaining ring 110 that extends completely around the deployment opening 60e. The retaining ring 110 secures the air bag 44e to the housing 40e. Also, the first end portion 82e of the flap 80e is secured to the housing 40e by the retaining ring 110. FIG. 9 also illustrates how, in any of the embodiments of the invention, the flap extends from the rearward or lower edge of the deployment opening of the module.

From the above description of the invention, those skilled in the art will perceive improvements, changes and modifications in the invention. For example, the invention is not limited to a passenger side air bag module, but could also be used with any air bag module including a driver side air bag module or a side impact or rollover module, for example. Such improvements, changes and modifications within the skill of the art are intended to be covered by the appended claims.

We claim:

1. An apparatus for helping to protect a vehicle occupant, said apparatus comprising:

an inflatable vehicle occupant protection device having a stored, deflated condition and an inflated condition for helping to protect the vehicle occupant;

an inflator for providing inflation fluid to inflate said protection device; and a flap made of fabric material, said flap being stored with said protection device, said flap having a first end portion and an opposite second end portion, said first end portion of said flap being fixed relative to said protection device and said second end portion of said flap not being fixed relative to said protection device;

said flap being deployed by inflation of said protection device into a position adapted to engage and cover a head of a vehicle occupant with said second end portion of said flap adapted to be located over and past the head the vehicle occupant, said flap being adapted to guide deployment of said protection device over and past the head of the vehicle occupant, said flap being adapted to prevent said protection device from directly engaging the head of the vehicle occupant, said protection device sliding along said flap during inflation of said protection device.

2. An apparatus as set forth in claim 1 for mounting on an instrument panel of a vehicle, the instrument panel having an upper portion extending generally rearward in the vehicle from the vehicle windshield and defining a deployment opening facing generally upward and rearward in the vehicle and having a forward edge portion and a rearward edge portion, said flap when deployed extending from the rearward edge portion of the deployment opening.

3. An apparatus as set forth in claim 1 wherein said protection device has a rearward-facing outer surface portion that is closest to the vehicle occupant when said protection device is inflated, said flap extending along said rearward-facing outer surface portion of said protection device when said protection device is inflated.

4. An apparatus as set forth in claim 1 wherein said flap has first and second major side surfaces, said first major side surface of said flap having a higher coefficient of friction than said second major side surface of said flap, said first major side surface of said flap facing rearward toward the vehicle occupant when said protection device is inflated, said second major side surface of said flap facing forward and extending along a rearward-facing outer surface portion of said protection device when said protection device is inflated.

5. An apparatus as set forth in claim 1 wherein said apparatus includes a housing in which said protection device in the deflated condition and said flap are stored.

6. An apparatus as set forth in claim 1 wherein said apparatus includes a housing in which said protection device is stored in the deflated condition, said flap being folded separately from and overlying said protection device when in the stored, deflated condition.

7. An apparatus as set forth in claim 1 wherein said apparatus includes a housing in which said protection device is stored in the deflated condition, said flap being folded with said protection device when in the stored, deflated condition.

8. An apparatus for helping to protect a vehicle occupant, said apparatus comprising:

an inflatable vehicle occupant protection device having a stored, deflated condition and an inflated condition for helping to protect the vehicle occupant;

an inflator for providing inflation fluid to inflate said protection device; and a flap made of fabric material, said flap being stored with said protection device;

said flap being deployed by inflation of said protection device into a position adapted to engage and cover a head of a vehicle occupant for guiding deployment of said protection device over the head of the vehicle occupant, a first end portion of said flap being sewn to said protection device with a permanent stitching section and a second end portion of said flap being sewn to said protection device with a releasable stitching section.

9. An apparatus for helping to protect a vehicle occupant, said apparatus comprising:

an inflatable vehicle occupant protection device having a stored, deflated condition and an inflated condition for helping to protect the vehicle occupant;

an inflator for providing inflation fluid to inflate said protection device; and a flap made of fabric material, said flap being stored with said protection device;

said flap being deployed by inflation of said protection device into a position adapted to engage and cover a head of a vehicle occupant for guiding deployment of said protection device over the head of the vehicle occupant, opposite end portions of said flap being sewn to said protection device, said flap having a rupturable portion located intermediate said end portions, said flap rupturing at said rupturable portion upon inflation of said protection device to enable said flap to move into a position engaging and covering the a head of the a vehicle occupant.

* * * * *